(12) United States Patent
Bularz et al.

(10) Patent No.: US 10,363,935 B2
(45) Date of Patent: Jul. 30, 2019

(54) METHOD FOR OPERATING A VEHICLE HAVING A MANUAL TRANSMISSION

(71) Applicant: Ford Global Technologies, LLC, Dearborn, MI (US)

(72) Inventors: Tadeusz Bularz, Essen (DE); Mike John Mould, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 15/299,192

(22) Filed: Oct. 20, 2016

(65) Prior Publication Data
US 2017/0113693 A1 Apr. 27, 2017

(30) Foreign Application Priority Data
Oct. 21, 2015 (DE) .................... 10 2015 220 468

(51) Int. Cl.
*B60W 30/18* (2012.01)
*B60W 10/06* (2006.01)
*B60W 10/188* (2012.01)
*F02N 11/08* (2006.01)

(52) U.S. Cl.
CPC ...... *B60W 30/18054* (2013.01); *B60W 10/06* (2013.01); *B60W 10/188* (2013.01); *B60W 30/18027* (2013.01); *F02N 11/0818* (2013.01); *B60W 2510/0208* (2013.01); *B60W 2510/101* (2013.01); *B60W 2520/04* (2013.01); *B60W 2520/16* (2013.01); *B60W 2540/12* (2013.01); *B60W 2540/14* (2013.01); *B60W 2710/182* (2013.01); *F02N 2200/0802* (2013.01); *F02N 2200/10* (2013.01); *F02N 2200/102* (2013.01);
(Continued)

(58) Field of Classification Search
CPC ..... B60W 30/18054; B60W 30/18118; B60W 40/076
See application file for complete search history.

(56) References Cited

U.S. PATENT DOCUMENTS 6,763,903 B2 * 7/2004 Morimoto .............. B60K 6/485
180/65.26
7,665,808 B2 * 2/2010 Deprez .................... B60T 7/00
188/DIG. 2
(Continued)

FOREIGN PATENT DOCUMENTS

DE 19912878 A1 4/2000
DE 102005011559 A1 9/2006

*Primary Examiner* — Derek D Knight
(74) *Attorney, Agent, or Firm* — Raymond L. Coppiellie; Burgess Law Office, PLLC

(57) ABSTRACT

A method for controlling vehicle operation of a vehicle having a standard transmission, a clutch, a service brake activated by a brake pedal, and an engine controller configured to shut off the engine after a stationary state of the vehicle has been reached. The method including shutting off the engine in a stopping step if an idling position of the manually shifted transmission has been engaged and if the clutch has been engaged and restarting engine in a chronologically subsequent starting step upon activation of a pedal, including a clutch pedal. The service brake configured to apply a brake pressure directly after release of the brake pedal for predetermined time period or interval between the stopping step and the starting step.

13 Claims, 1 Drawing Sheet

(52) U.S. Cl.
CPC . *F02N 2200/103* (2013.01); *F02N 2300/2011* (2013.01); *Y02T 10/48* (2013.01)

(56) References Cited

U.S. PATENT DOCUMENTS

| | | | |
|---|---|---|---|
| 8,579,764 B2 * | 11/2013 | Morita | B60W 10/02 |
| | | | 477/173 |
| 9,074,571 B1 * | 7/2015 | Malone | F02N 11/0822 |
| 9,365,209 B2 | 6/2016 | Hu et al. | |
| 9,545,900 B2 * | 1/2017 | Moriya | B60W 10/06 |
| 9,802,612 B2 * | 10/2017 | Ogata | B60W 10/06 |
| 2003/0144111 A1 * | 7/2003 | Kato | F16H 61/0021 |
| | | | 477/92 |
| 2013/0231848 A1 * | 9/2013 | Roberts | F02N 11/0807 |
| | | | 701/112 |

* cited by examiner

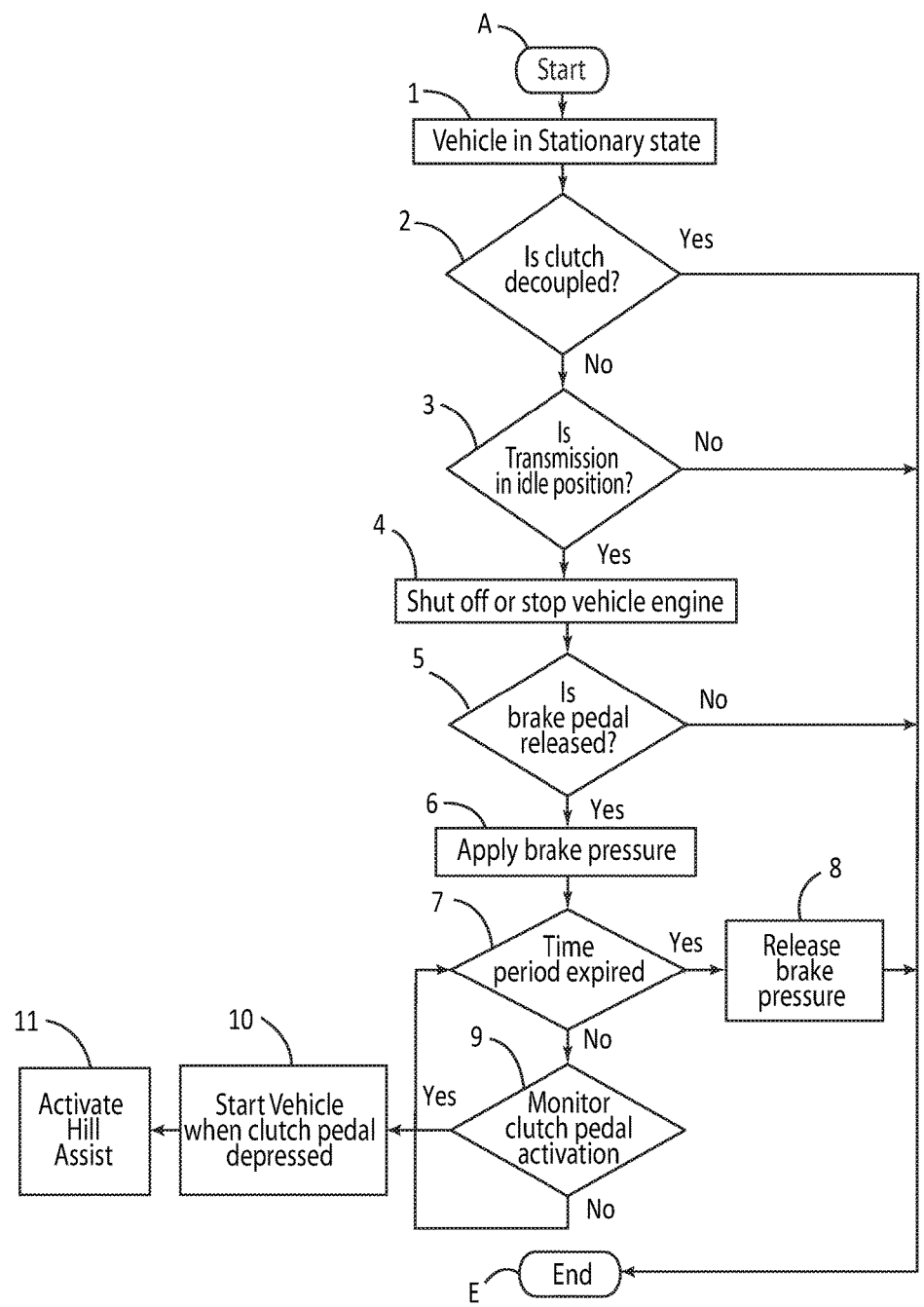

METHOD FOR OPERATING A VEHICLE HAVING A MANUAL TRANSMISSION

CROSS-REFERENCE TO RELATED APPLICATIONS

Not Applicable.

BACKGROUND OF THE INVENTION

1. Field of the Invention

The present invention relates to a method for operating a motor vehicle, and more specifically to a method for operating a vehicle having a start/stop system.

2. Description of Related Art

Commercially available engine control systems, also referred to as stop/start systems, start/stop systems, or automatic start/stop systems reduce fuel consumption in stationary phases of motor vehicle operation. For example, when stopped at a traffic light, in particular in city traffic, in a stationary state under certain conditions the engine is automatically shut off and restarted. In vehicles having a manual transmission with a manually activated clutch, upon selecting an idling position and engaging the clutch, i.e. releasing the clutch pedal, a control unit shuts the engine off. Upon activating or depressing the clutch pedal, the control unit restarts the engine.

Besides conserving energy or fuel, and the associated emission of pollutants, such support and assistance systems may increase operation and comfort. In one example, the vehicle includes a hill holder or hill holder assist system providing automated assistance and reducing vehicle rollback when starting on inclines.

Such systems hill holder or hill start assist systems use at least part of the existing brake system to hold the vehicle temporarily on the incline by activating the vehicle brakes. Automated transmissions provide the advantage over manual transmissions in that, depending on the situation, they provide at least a low creeping torque. In contrast, when placed on an inclined and the automated or manually activated clutch separates, is in a decoupled state, a vehicle can roll forward or back a significant distance. In particular, when on severe inclines, this movement may entail an increased feeling of a lack of safety or increased stress in the driver.

A vehicle brought to a stop on a gradient, with a standard transmission and an automatic start/stop system, can roll after the vehicle stops and the brake pedal has been released but before the drive engine is started. Although generally confusing for the driver of the vehicle, it is also surprising as the driver is not used to such movement when the vehicle has a hill holder system. While such systems should avoid such situations, rollback or movement can happen because such systems are not activated at a predefined clutch position. The result being a risk that the hill holder or hill start assist system has a delayed start whereby the vehicle may roll back if the brake is released too quickly and/or the clutch is disengaged after a delay.

SUMMARY OF THE INVENTION

A method of operating a vehicle having a manually shifted transmission having an idling position, a clutch, and a service brake activated by a brake pedal including stopping engine operation when the vehicle reaches a stationary state, the idling position of the manually shifted transmission is engaged, and the clutch has been engaged. Restarting engine operation after the brake pedal is released where the service brake generates a brake pressure for a predefined time period after release of the brake pedal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein:

FIG. 1 is a flowchart of a schematic sequence of an exemplary embodiment of the method according to the invention.

DETAILED DESCRIPTION OF THE PREFERRED EMBODIMENTS

The following description of the preferred embodiment(s) is merely exemplary and is not intended to limit the invention, its application, or uses.

FIG. 1 shows a method for controlling the starting behavior of a motor vehicle. The method relates to vehicles having a standard transmission, for example a manually shifted transmission. The term standard transmission includes transmissions in which a gear change is brought about by activating intervention, for example, foot-shift transmissions. In one example, the vehicle includes a clutch, for example a frictionally locking clutch released during operation and arranged in the drive train of the vehicle, between the engine and the standard transmission. As understood, the clutch interrupts the force flux or power transfer between the vehicle engine and transmission if the gear speed is changed or the vehicle is stationary with the engine running.

The vehicle also includes a service brake system including a service brake typically activated by a brake pedal. As used herein the service brake is a brake configured to slow the vehicle in the normal operating mode and bring it to a standstill. The brake can be graduated and act on all the wheels of the vehicle. A parking brake device that normally acts on two of four wheels is not a service brake as used herein.

Initially, a brake pedal acts on a service brake causing it to apply brake pressure to slow the vehicle and ultimately bring the vehicle to a stationary state. As shown in FIG. 1 the method begins at starting point A and in step 1 the vehicle is in a stationary state.

Step 2 determines whether the clutch pedal is depressed, i.e. the clutch is decoupled. If so, the method advances to step E where the vehicle continues normal operation and releases the brake pressure applied by the hill holder or hill start assist system. If the clutch pedal is released in step 2 wherein the clutch is coupled or engaged with the standard or manual transmission, the method proceeds to step 3 and determines whether the manual transmission is in an idle or neutral position. If the manual transmission is not in an idle or neutral position, the method advances to step E and releases the brake pressure. If, the manual transmission is in an idle or neutral position the method advances to step 4 wherein the vehicle engine is stopped or shut off.

An engine controller is one example of a mechanism configured to stop or shut off the vehicle engine or motor on or after reaching a stationary state of the vehicle; i.e., the vehicle stops in a stopping step 4 if an idling position of the manually shifted transmission has been engaged and if the clutch has been engaged. The engine or motor is restarted in a chronologically later starting step when a pedal is activated. For example, activation of the accelerator pedal triggers the starting step. In a further example, activation of the clutch pedal triggers the starting step.

Besides the conditions, specified above, for triggering the stopping step 4, further conditions can be set out. For example, one or more temperature specifications, relating to the temperature of the coolant fluid, the temperature of the passenger compartment, or the external temperature may be used. The may be one or more additional conditions preventing triggering of the stopping step 4, for example, a battery voltage specification or a specification of underpressure of the service brake device, in particular of the brake booster.

As shown in FIG. 1 if the conditions of steps 2 and 3 are not met, the normal operating mode of the vehicle is continued in step E.

When the vehicle remains in a stopped condition, step 4, the method moves to step 5, which determines whether the vehicle driver/operator releases the brake pedal to release the service brake of the vehicle. If the brake pedal is released in step 5, the method moves to step 6 wherein the service brake pressure of the service brake, applied and stored in step 1, is maintained for a predefined time period, for example 200 ms.

Step 7 of the method monitors the time sequence with a timer function. In the shown example, the service brake system provides a brake pressure directly after release of the brake pedal for a predefined time period occurring in a time interval between the stopping step and the starting step unless the starting step has been triggered in the meantime. The brake pressure understood to be the pressure in a braking state of the service brake sufficient to hold the vehicle in a stationary state for a certain time despite releasing the brake pedal. The brake pressure can be determined in a holding-situation-specific fashion based on an inclination of the vehicle determined by an inclination sensor. The brake pressure preferably acts on the brakes of all the wheels of the vehicle.

In one example, the service brake is an electro-hydraulic service brake. The braking request registered electronically at the electro-hydraulic service brake using sensor technology. In this context, a travel sensor acquires the time profile of the brake pedal travel and, therefrom, the pedal speed and pedal acceleration. In addition, a pressure sensor acquires a pressure profile. The control unit derives from the above the driver's braking request (partial braking, emergency braking, etc.) and calculates the setpoint pressure for each wheel brake in the current driving situation. The control unit regulates a hydraulic pressure that builds up an individual service brake pressure for each wheel. Pressure sensors in each wheel line acquire the actual pressure, so that the setpoint pressure can be individually adjusted for each wheel.

In step 8, the brake pressure in the service brake remains for the predetermined time period set forth in step 7. Upon expiration of the time period the method moves to step E and releases the brake pressure wherein the vehicle is in a normal braking mode.

Step 9 monitors the timer and clutch pedal activation. If during the predefined holding period, the clutch pedal is activated or depressed, for example the predefined position of the clutch is reached, a starting step 10 triggers the engine controller to start the vehicle and additionally activates the hill holder or hill assist system of the vehicle as shown in step 11.

The activation of the hill holder system in step 11 and the maintenance of the brake pressure in step 6 may also depend on other conditions based on the vehicle situation, not illustrated in FIG. 1. The activation, i.e. execution of both steps, depends preferably on a value measured by an inclination sensor provided in the vehicle.

The method controls the starting behavior of a vehicle having a standard transmission, a clutch, a service brake activated by a brake pedal, and an engine controller configured to stop or shut off the engine. The engine is stopped or shut off after the vehicle has stopped, in stopping step 4, if the clutch has been engaged, step 2, and if an idling position of the manually shifted transmission has been engaged, step 3. The engine is restarted in a chronologically subsequent starting step, step 9, when the pedal is activated—the latter is also referred to for short as an automatic start/stop system—to the effect that undesired rolling back of the vehicle is better avoided.

According to the invention, the method prevents the vehicle from rolling back before restarting the engine for a predefined time period despite the brake pedal being released and, in particular, when decoupling of the clutch has been delayed. As a result, the starting behavior of a vehicle with a standard transmission and automatic start/stop system in the time interval between the stopping step and the starting step is improved.

Maintaining brake pressure is understood to mean any profile of brake pressure sufficient to hold the vehicle for a certain subsequent time period after the initial release of the brake pedal and if the brake pressure drops more slowly than a drop in a brake pressure, which can be achieved by the unimpeded release of the brake pedal. Constant maintenance of a specific brake pressure value over a predefined time period after initiating the release of the brake pedal is preferred. The predefined time period is preferably 200 ms or more.

The brake pressure is also preferably maintained as a function of at least one measured value of a vehicle-internal sensor, for example of an inclination sensor. For example, the pressure is maintained only when a predefined value is reached and/or exceeded by the sensor measured value. The objective is, for example, to detect whether a stationary vehicle is on a gradient. The system searches for an indication that the longitudinal direction of the vehicle is inclined with respect to the horizontal. Preferably using an inclination sensor that supplies a value for the current inclination of the vehicle where a value unequal to zero indicates the vehicle is on a gradient. When the inclination of the vehicle, in the stationary state, is recognized as being above a threshold value, for example VA, and if the brake pedal has been released, a positive decision on the maintenance of the service brake pressure is generated.

The hill holder system configured to apply a brake pressure when the brake pedal is released and the vehicle is stationary, as a function of a clutch intervention, in particular as a function of a position of the clutch pedal and, if appropriate, when further conditions are satisfied, such as when a predefined inclination of the vehicle is exceeded. The activation of the hill holder system preferably requires at least that a predefined depressed position of the clutch pedal is reached from the unactivated position of rest of the clutch pedal, i.e. the decoupled state of the clutch of the vehicle is reached or at least approximately reached. Combined with the hill holder system the method prevents rolling back of the vehicle in the stop phase of an automatic start/stop system. The maintenance of the brake pressure is extended, for example, by an additional 200-250 ms.

According to the disclosed example, the vehicle is prevented from rolling back before starting of the engine for a predefined time period despite a released brake pedal and, in particular, when the decoupling is delayed. As a result, the starting behavior of a vehicle with a standard transmission and automatic start/stop system in the time interval between a stopping step and a starting step is improved.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of vehicle operation comprising:
   providing a manual transmission having an idling position, a clutch, and a service brake activated by a brake pedal;
   depressing the brake pedal and activating the service brake to bring the vehicle to a stationary state;
   stopping engine operation when the vehicle reaches the stationary state, the idling position of the manual transmission is engaged, and the clutch is engaged;
   starting engine operation after releasing the brake pedal; and,
   generating a brake pressure for a predefined time period starting when releasing the brake pedal.

2. The method of claim 1 wherein the brake pressure is applied before the release of the brake pedal and is maintained for the predefined time.

3. The method of claim 1 wherein the brake pressure is maintained at a constant level.

4. The method of claim 1 wherein the brake pressure is applied based on a measured value of a sensor.

5. The method of claim 4 wherein the sensor is an inclination sensor.

6. The method of claim 1 wherein the predefined time period is at least 200 ms.

7. The method of claim 1 wherein the starting engine operation is triggered by activation of a clutch pedal of the clutch.

8. The method of claim 1 including a hill holder system configured to apply brake pressure when releasing the brake pedal and when the vehicle is stationary, as a function of a clutch intervention, in particular a position of the clutch pedal.

9. A vehicle comprising:
   an engine;
   a manual transmission;
   a clutch;
   a service brake activated by a brake pedal;
   an engine controller operative to shut off the engine after the vehicle stops when an idling position of the manual transmission is engaged and when the clutch has been engaged, and restart the engine when the clutch is disengaged; and
   the service brake operative to apply a brake pressure after release of the brake pedal for a predefined time period.

10. The vehicle as claimed in claim 9, wherein the service brake device is an electro-hydraulic service brake device.

11. A method for controlling vehicle operation comprising:
   providing a manually shifted transmission having an idling position, a clutch, and a service brake activated by a brake pedal;
   depressing the brake pedal and activating the service brake to bring the vehicle to a stationary state;
   stopping engine operation when the vehicle reaches the stationary state, the idling position of the manually shifted transmission is engaged, and the clutch has been engaged;
   starting engine operation when the brake pedal is released and a clutch pedal is depressed; and
   the service brake generating a brake pressure after release of the brake pedal for a predefined time period of at least 200 ms based on the measured value of an inclination sensor.

12. The method of claim 11 wherein the brake is applied directly before the release of the brake pedal and is maintained for the predefined time.

13. The method of claim 11 including a hill holder system configured to apply a brake pressure when the brake pedal is released and when the vehicle is stationary, as a function of a clutch intervention, in particular of a position of the clutch pedal.

* * * * *